US009574432B2

(12) United States Patent
Ringer et al.

(10) Patent No.: US 9,574,432 B2
(45) Date of Patent: *Feb. 21, 2017

(54) OPTIMIZED DRILLING

(75) Inventors: Maurice Ringer, Cambridge (GB);
Michael P. Barrett, Histon (GB);
Benjamin P. Jeffryes, Histon (GB);
Walter David Aldred, Thriplow (GB);
Ashley Johnson, Milton (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 568 days.

This patent is subject to a terminal disclaimer.

(21) Appl. No.: 13/993,640

(22) PCT Filed: Dec. 13, 2011

(86) PCT No.: PCT/IB2011/003045
§ 371 (c)(1),
(2), (4) Date: Sep. 27, 2013

(87) PCT Pub. No.: WO2012/080819
PCT Pub. Date: Jun. 21, 2012

(65) Prior Publication Data
US 2014/0027174 A1    Jan. 30, 2014

Related U.S. Application Data

(60) Provisional application No. 61/422,409, filed on Dec. 13, 2010, provisional application No. 61/422,412,
(Continued)

(51) Int. Cl.
*E21B 45/00*   (2006.01)
*E21B 44/02*   (2006.01)
(Continued)

(52) U.S. Cl.
CPC ............... *E21B 44/02* (2013.01); *E21B 4/02* (2013.01); *E21B 44/00* (2013.01); *E21B 45/00* (2013.01);
(Continued)

(58) Field of Classification Search
USPC .......................................... 175/26
See application file for complete search history.

(56) References Cited

U.S. PATENT DOCUMENTS 2,958,511 A    11/1960   Pfefferle
2,958,821 A    11/1960   Webb
(Continued)

FOREIGN PATENT DOCUMENTS

RU    2405099 A    7/2010
WO    2006065678 A2    6/2006
(Continued)

OTHER PUBLICATIONS

International Search Report and Written Opinion of PCT Application No. PCT/IB2011/003019 dated Aug. 7, 2012: pp. 1-11.
(Continued)

*Primary Examiner* — Taras P Bemko
(74) *Attorney, Agent, or Firm* — Joan Beckner

(57) ABSTRACT

The invention provides a method of optimizing the rate of penetration of a hydraulically or pneumatically powered rotor and stator driven drill as it drills a wellbore into the earth, the method comprising: (a) measuring a first set of rotor and stator operating parameters including the weight applied to the drill bit, the speed of rotation of the rotor and rotor torque for a first period of time, (b) generating a first set of relationships from the first set of operating parameters to enable the rotor speed and rotor torque to be predicted over a range of operating parameter values, (c) determining the rate of penetration for the first period of time from
(Continued)

measurements of weight applied to the bit and rotation speed of the bit, (d) determining whether any other combination of weight applied to bit and rotation speed of bit, provided by the relationships determined in step (b) are capable of providing a greater rate of penetration, and (e) adjusting at least one operating parameter to move the weight applied to bit and/or speed of rotation of bit towards the combination which provides a first greater rate of penetration.

20 Claims, 10 Drawing Sheets

Related U.S. Application Data filed on Dec. 13, 2010, provisional application No. 61/422,420, filed on Dec. 13, 2010.

(51) Int. Cl.
| | | |
|---|---|---|
| E21B 4/02 | (2006.01) | |
| E21B 47/00 | (2012.01) | |
| G01P 3/487 | (2006.01) | |
| E21B 44/00 | (2006.01) | |
| G01P 3/44 | (2006.01) | |

(52) U.S. Cl.
CPC ............... *E21B 47/00* (2013.01); *G01P 3/44* (2013.01); *G01P 3/487* (2013.01); *H02K 11/215* (2016.01)

(56) References Cited

U.S. PATENT DOCUMENTS

| | | | |
|---|---|---|---|
| 4,545,214 A | | 10/1985 | Kinoshita |
| 4,630,691 A | * | 12/1986 | Hooper .................. E21B 21/00 166/187 |
| 4,647,853 A | | 3/1987 | Cobern |
| 4,941,951 A | | 7/1990 | Sheppard et al. |
| 5,368,108 A | | 11/1994 | Aldred et al. |
| 5,415,030 A | | 5/1995 | Jogi et al. |
| 6,234,259 B1 | | 5/2001 | Kuckes et al. |
| 6,498,474 B1 | | 12/2002 | Turner |
| 2003/0205998 A1 | | 11/2003 | Heremans et al. |
| 2004/0035608 A1 | | 2/2004 | Meehan et al. |
| 2004/0251898 A1 | | 12/2004 | Morys et al. |
| 2005/0155349 A1 | | 7/2005 | Sugiura et al. |
| 2006/0131074 A1 | * | 6/2006 | Calhoun ............... E21B 49/006 175/50 |
| 2006/0162962 A1 | | 7/2006 | Koederitz et al. |
| 2006/0227005 A1 | * | 10/2006 | Fincher ................... E21B 47/12 340/855.4 |
| 2006/0279243 A1 | | 12/2006 | Schachtl et al. |
| 2008/0156531 A1 | | 7/2008 | Boone et al. |
| 2008/0164062 A1 | | 7/2008 | Brackin et al. |
| 2008/0170841 A1 | | 7/2008 | Schneider et al. |
| 2009/0039872 A1 | | 2/2009 | Fischer |
| 2009/0236149 A1 | | 9/2009 | Main |
| 2010/0301846 A1 | | 12/2010 | Lee |

FOREIGN PATENT DOCUMENTS

| | | |
|---|---|---|
| WO | 2010043951 | 4/2010 |
| WO | 2010065646 | 6/2010 |
| WO | 2012080810 | 6/2012 |
| WO | 2012080812 | 6/2012 |

OTHER PUBLICATIONS

International Search Report and Written Opinion of PCT Application No. PCT/IB2011/003017 dated Aug. 30, 2012: pp. 1-10.
International Search Report and Written Opinion of PCT Application No. PCT/IB2011/003045 dated Sep. 17, 2012: pp. 1-11.

* cited by examiner

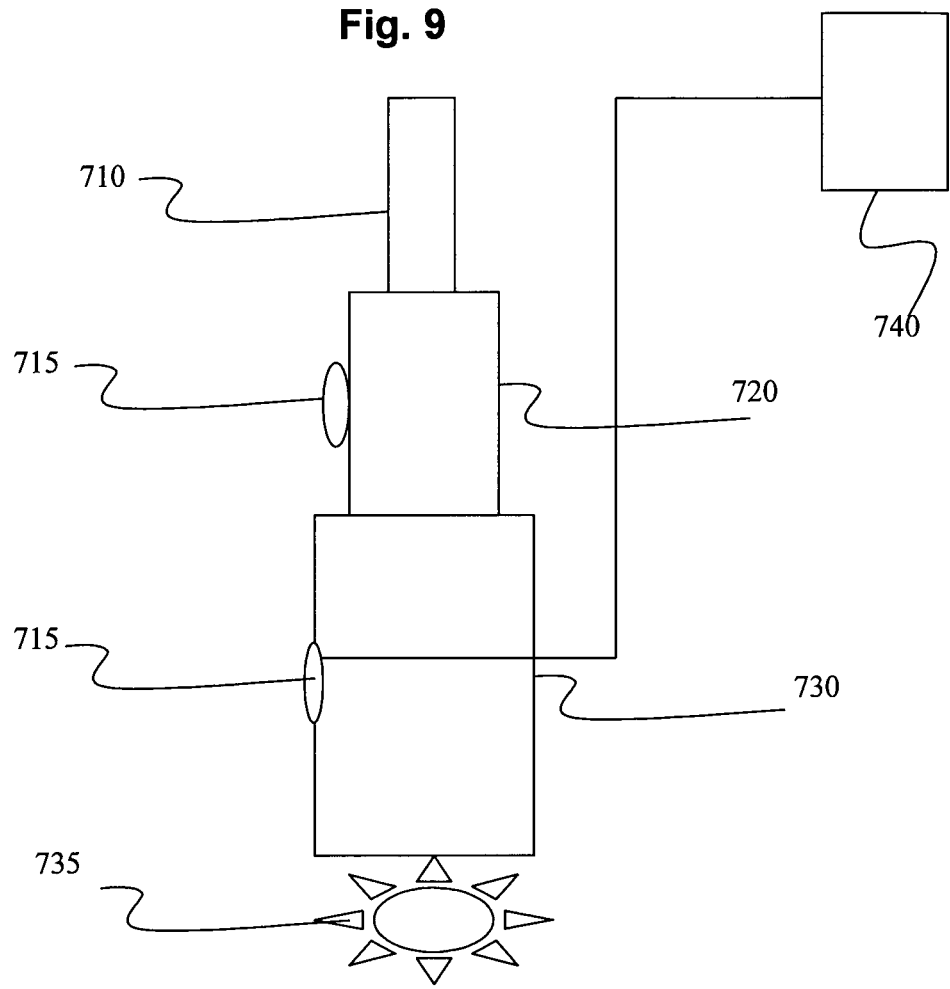

OPTIMIZED DRILLING

CROSS-REFERENCE TO RELATED APPLICATIONS

This application is a U.S. National Stage Application under 35 U.S.C. §371 and claims priority to PCT Application Number PCT/IB2011/003045 filed Dec. 13, 2011, which claims the benefit of U.S. Provisional Patent Application Ser. Nos. 61/422,420 filed Dec. 13, 2010; 61/422,412 filed Dec. 13, 2010; and 61/422,409 filed Dec. 13, 2010. All of these applications are incorporated herein by reference in their entireties.

TECHNICAL FIELD

The present invention relates to optimizing the rate of penetration of a downhole drill powered by a downhole motor, where the system may comprise a drill bit connected to a rotor within a stator e.g. a positive displacement motor, a drill bit connected to a turbine and/or the like.

BACKGROUND

Downhole motors are used in the hydrocarbon industry to apply mechanical power at a downhole location to a drill bit in oil and/or gas wells for drilling applications. The downhole motor, sometimes referred to as a mud motor, is positioned at the bottom of a drillstring and coupled via an output shaft with a drill bit. Drilling fluid, sometimes referred to as drilling mud or simply mud, is pumped down the drillstring and through the downhole motor. The downhole motor uses the force of the pumped/flowing drilling fluid to produce a mechanical output, a rotation of the output shaft and, in turn, the drill bit.

Although there are different types of downhole/mud motors, the most commonly used type today is a positive displacement motor which uses an elongated, helically-shaped rotor within a corresponding helically shaped stator. The flow of drilling fluid or mud between the stator and rotor causes the rotor to orbit within the stator eccentrically about the longitudinal axis of the stator. The rotor itself rotates about its longitudinal axis and also orbits around the central longitudinal axis of the stator. This eccentric orbit and rotation of the rotor is transferred by a suitable transmission assembly, such as a universal joint assembly, to produce a concentric rotation for the output shaft.

Other types of downhole motors include turbines in which a rotor/shaft equipped with vanes is caused to rotate by a fluid—a liquid or a gas—passing through the turbine, and interacting with the vanes on the rotor/shaft.

The downhole motor is a kind of downhole dynamic drilling tool that converts the power of drilling mud to a rotation of the drill bit; an application of torque and speed to the drill bit. The advantages of using a downhole motor is that it provides: an increased rate of penetration; better hole deviation control; reduced drill string failure rate.

A downhole motor, mud motor or drilling motor may also be referred to as a Progressive Cavity Positive Displacement Pump that may be disposed on the drillstring to provide additional power to the bit during a drilling process. As described above, the downhole motor uses the drilling fluid to create eccentric motion in the power section of the motor, which is transferred as concentric power to the drill bit. The downhole motor uses different rotor and stator configurations to provide optimum performance for the desired drilling operation; typically the number of lobes and the length of power assembly may be increased to provide greater horsepower. In certain applications, compressed air or other compressed gases may be used to input power to the downhole motor. A rotation of the bit while using a downhole motor may be from about 60 rpm to over 100 rpm.

Downhole motors may comprise a top sub, which connects the downhole motor to the drillstring; the power section, which consists of the rotor and the stator; the transmission section, where the eccentric power from the rotor is transmitted as concentric power to the bit; the bearing assembly which protects the tool from off bottom and on bottom pressures; and the bottom, sub which connects the downhole motor to the bit.

The use of downhole motors is greatly dependent on financial efficiency. In straight vertical holes, the mud motor may be used for increased rate of penetration (ROP), or to minimize erosion and wear on the drill string, since the drill string does not need to be turned as fast. However, the majority of downhole motor use is for directional drilling. Although other methods may be used to steer the drill to directionally drill a borehole, a downhole motor may be the most cost effective method.

In some aspects, the downhole motor may be configured to have include a bend section to provide for directional drilling. Typically, downhole motors can be modified in a range of around zero to four degrees to provide for directional drilling with approximately six increments in deviation per degree of bend. The amount of bend is determined by rate of climb needed to reach the target zone. By using a measurement while drilling (MWD) Tool, a directional driller can steer the bit, which is driven by the downhole motor, to the desired target zone.

The power section of the downhole motor consists of the stator and the rotor. In certain downhole motors, the stator comprises a rubber sleeve on the wall of a steel tube, where the inside of the rubber sleeve defines a spiral structure with a certain geometric parameter. The rotor comprises a shaft, such as a steel shaft, that may be coated with a wear resistant coating, such as chrome and may have a helical profile configured to run/turn/rotate inside the stator.

In the drilling procedure, drilling fluid is pumped downhole through the drill pipe at a given rate and pressure. The downhole motor converts the hydraulic energy of the drilling fluid passing through the power section into mechanical energy, rotation and torque. This mechanical energy is transferred from the downhole motor to the drill bit.

An alternative to using a positive displacement motor is to employ a turbine, in a process often referred to as turbodrilling. In the turbodrill method, power is generated at the bottom of the hole by mud-operated turbines. The turbodrill consists of four basic components: the upper, or thrust, bearing; the turbines, the lower bearing; and the bit. In operation, mud is pumped through the drill pipe, passing through the thrust bearing and into the turbine. In the turbine, stators attached to the body of the tool divert the mud flow onto the rotors attached to the shaft. This causes the shaft, which is connected to the bit, to rotate. The mud passes through a hollow part of the shaft in the lower bearing and through the bit, as in rotary drilling, to remove cuttings, cool the bit, and perform the other functions of the drilling fluid. The capacity of the mud, which is the power source, determines rotational speed.

Multistage high efficiency reaction turbine blades extract hydrolic energy from the flowing mud stream and convert it to mechanical energy (torque and rotation) to drive the drill bit. Each turbine stage consists of a stator, fixed to the body of the tool, and a rotor fixed to the output shaft. These are designed to work in unison, directing and accelerating the mud as it passes through each stage. To achieve the high power and torque levels necessary in performance drilling applications, complete tools are built with approximately 150 sets of identical rotor and stator pairs. To ensure a long life the rotors and stators are manufactured using high performance alloys, which are resistant to both erosion and corrosion.

Similar to a positive displacement motor, the turbodrill generates mechanical power through a pressure drop across the drive system coupled with the fluid flow rate. Generally, the greater the pressure drop capacity of the tool, the greater the potential for delivering mechanical power to the bit. Because the turbodrill power generation system is entirely mechanic, it is capable of supporting an extremely high pressure drop that creates greater mechanical power compared with a mud motor.

In view of their benefits positive displacement motors (PDMs) and turbines are used prolifically in oilfield drilling operations to increase the rotary speed and torque supplied to the bit during drilling.

Although widely used, it is, however, usually unknown exactly the downhole motor is performing, i.e., how much rotary speed and torque is generated etc., by the downhole motor during a downhole drilling operation. In general, the only performance knowledge for the downhole motor is derived guides to the performance of the motor from the motor manufacturer. This manufacturer's guide can take the form of a chart relating the torque and rotation speed of the rotor/turbine as a function of the pressure drop across the motor. However, these charts are generated under surface conditions using an ideal fluid such as water so provide little incite regarding the actual performance of the downhole motor under downhole conditions and being driven by a drilling fluid or the like.

During a downhole drilling operation the downhole conditions give rise to a wide variety of sources of deviation from the manufacturer's performance charts. Such sources of deviation include extremes of temperature and pressure, variation in the properties of the drilling mud, wear of the motor and associated components. All of these can influence the performance of the motor and result in the manufacturer's charts losing accuracy.

Drilling operators in the field are aware of this source of deviation and as a result do not rely on the accuracy of manufacturer's performance charts. As such, drilling operators tend to drill more conservatively than the charts would indicate were possible, to avoid pushing the drill beyond the point of optimal performance and risk stalling the drill.

The effect of this type of conservative operation is that downhole motors and turbines are generally operated suboptimally, operating below the maximum power output and efficiency possible.

Furthermore, published manufacture curves are often not available for turbines and drillers have only theoretical approximations as to the turbine's speed or power output, making their efficient operation even more problematic.

To a first approximation, the rate of penetration of a drill is maximized when both the weight-on-bit (WOB) and speed of rotation are maximized. However these parameters cannot both be increased indefinitely, as constraints in the system provide a ceiling beyond which drilling cannot proceed. For conventional drilling, a primary constraint is the available power in the top drive, which effectively places a constraint on the combinations of weight-on-bit and rotation speed that are possible.

In many drilling scenarios, the rate of penetration is therefore maximized when operating at the maximum available power of the top drive. Conventional rate of penetration optimization therefore is in determining which combinations of weight-on-bit and rotation speed, given an available power, provide the optimal rate of penetration.

When a mud motor or turbine assisted drilling is employed, the constraint provided by the available power of the top drive may be exceeded, due to the additional hydraulic power provided by the motor or turbine. Thus, greater rates of penetration can be achieved because the important power constraint effectively allows greater weight-on-bit and/or rotation speed.

Patent application WO 2010/043951 discloses a method of optimising the rate of penetration of a drill. The primary parameters employed to predict rate of penetration are the weight applied to the drill bit and the rotation speed of the drill bit.

However, as discussed above, in order to maximize rate of penetration, it is essential to know the maximum available hydraulic power. Attempts to maximize rate of penetration without a knowledge of the available power in a mud motor will result in a stall, which slows down the rate of progress and defeats the object of maximizing rate of penetration.

Thus, even with a knowledge of how to optimize rate of penetration, if a knowledge of the performance of the downhole motor and/or available hydraulic power is not known, not known under operating condition and/or not know in real-time—the drilling system will be operated conservatively and therefore the combinations of weight-on-bit and rotation speed available to a driller (which may be a person, a processor etc.) will provide a reduced rate of penetration than what would be possible if the true performance of the mud motor were known to the operator/driller.

SUMMARY

In this specification, the terms drilling turbine, shaft, drive shaft and/or rotor may be used interchangeably to describe the element(s) rotating in the downhole motor and driving the rotation of the drill bit.

Thus, in a first aspect, the present invention relates to a method of optimising the rate of penetration of a downhole motor such as a hydraulically or pneumatically powered rotor and stator driven drill as it drills a wellbore into the earth, the method comprising:
  (a) measuring a first set of rotor and stator operating parameters including the weight applied to the drill bit, the speed of rotation of the rotor and rotor torque for a first period of time,
  (b) generating a first set of relationships from the first set of operating parameters to enable the rotor speed and rotor torque to be predicted over a range of operating parameter values,
  (c) determining the rate of penetration for the first period of time from measurements of weight applied to the bit and rotation speed of the bit,
  (d) determining whether any other combination of weight applied to bit and rotation speed of bit, provided by the relationships determined in step (b) are capable of providing a greater rate of penetration, and
  (e) adjusting at least one operating parameter to move the weight applied to bit and/or speed of rotation of bit towards the combination which provides a first greater rate of penetration.

It has been found that if measurements, either directly or indirectly, are made of the speed of rotation and/or torque provided by the downhole rotor and stator, then it is possible to generate predictive performance relationships of the available hydraulic power from the downhole measured parameters. These predictive relationships can then be used in place of manufacturer's charts, as they have been obtained by taking into account all of the sources of deviation from the manufacturers charts for the time period specified.

Such relationships are therefore based on real data and the only sources of error are the accuracy of the measurements made and how well the relationships fit the measured data.

Thus, embodiments of the present invention provide, among other things, a more accurate determination of the available hydraulic power of the rotor and stator, allowing the drilling operator to more confidently operate the drill in an optimal manner and without fear of causing the drill to stall.

BRIEF DESCRIPTION OF THE DRAWINGS

Embodiments of the invention will now be illustrated with reference to the following example and with reference to the following drawings in which:

FIG. 9 is a schematic-type illustration of a downhole motor system for drilling a borehole, in accordance with an embodiment of the present invention.

DESCRIPTION

Figure 1:
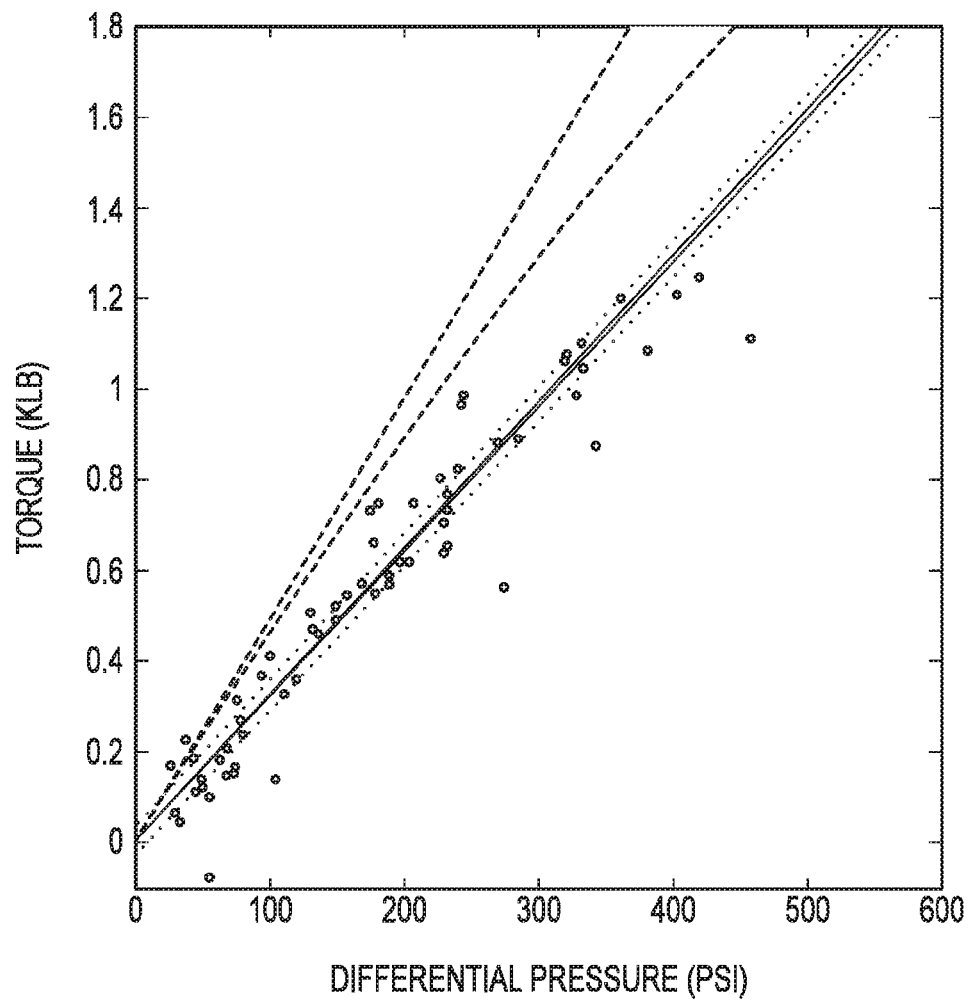
FIG. 1 is a chart showing the torque of a downhole rotor as a function of differential pressure across the rotor.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the scope of the invention as set forth herein.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As discussed above, the rotor and stator may form a positive or cavity displacement motor or a turbine. However, other rotor and stator arrangements are also possible. The measurements of the operating parameters can be directly made or inferred from other measurements.

The rotor can be hydraulically or pneumatically powered. This is carried out by application of a fluid, either a liquid or a gas, which transmits power to the rotor.

The measurements to be made may vary but it is required that at least a direct or indirect measurement of weight-on-bit, the speed of rotation of the rotor and of the torque provided by the rotor, is required.

A direct measurement of the speed of the motor can be made downhole in the vicinity of the motor and can be carried out by any known method in the art. However, if this is not possible, then indirect methods can be employed to infer the rotation speed such as monitoring vibration.

In general it is preferable that all measurements are made downhole, in order that the conditions downhole are accurately established. However that is not always possible and downhole parameters can be inferred from measurements made at the surface.

In some cases the measurements may be combined with any prior measurements or data, in order to infer the measurement desired. Examples of such earlier measurements include dynamometer tests or previous bit runs.

One important measured operating parameter is the torque produced by the rotor. The torque can be measured directly and downhole e.g. by use of a strain gauge. However, alternatively the torque can be inferred from a measurement of torque of the drillstring measured at the surface.

In accordance with an embodiment of the present invention, the torque measured at the surface can be thought of as having two components; i.e. the torque generated by the mud motor per se and the frictional forces experienced by the outer casing of the drill string as it rotates in the wellbore. Thus, in some embodiments of the present invention, by operating the drill "off-bottom" the torque measured at the surface can be taken to be equal to the well friction component.

In one embodiment, once known, any measured increase in torque at the surface from this base point during drilling can be taken to be due to torque generated by the motor downhole. This is therefore an example, in accordance with an embodiment of the present invention, of an indirect measurement of torque, combining the torque measured at the surface with a prior measurement of frictional torque when the drill was off-bottom in order to infer the torque generated by the rotor and stator.

In embodiments of the present invention, other operating parameters which are important to measure include the hydraulic power transmitted to the rotor. In accordance with an embodiment of the present invention, the hydraulic power transmitted to the rotor can be measured by separately measuring the pressure drop of the mud due to energy transfer to the rotor and measuring the flow rate of the mud through the rotor and stator.

In accordance with an embodiment of the present invention, the pressure drop of mud due to energy transfer to the motor can be inferred from surface measurements of pressure. This is because the pressure at the surface sometimes referred to as the "standpipe pressure" can be taken as made up of two components. The first component is the frictional pressure lost in pumping the mud down the drill string, through the motor and back up the annulus. The second component is the additional pressure lost due to energy transfer to the motor. Thus, in embodiments of the present invention, if the first component can be estimated, then the second component, which is the measurement of interest, can be inferred from the standpipe pressure measurement.

In accordance with an embodiment of the present invention, once the measurements have been made then the next step in the method is to establish relationships from the measured data.

In embodiments of the present invention, an important relationship is that between the torque generated by the rotor (T) and the pressure drop due to hydraulic energy transfer to the rotor $\Delta P$. In accordance with an embodiment of the present invention, it can be shown, for example, for a positive displacement motor, that to a first approximation:

$$T=a\Delta P$$

In embodiments of the present invention, from measurements of T and $\Delta P$ the constant "a" can be determined, for example by regression techniques or the like. In embodiments of the present invention, once the constant "a" is found, the relationship between T and $\Delta P$ may be derived. In some embodiments, other more complicated relationships may be employed provided that sufficient measurements are made to enable the unknown values of the constants to be determined.

In accordance with an embodiment of the present invention, another relationship that is used in downhole motor characterization is that between the speed of rotation of the rotor (S) and the pressure drop due to hydraulic energy transfer to the rotor ($\Delta P$). In accordance with an embodiment of the present invention, it can be shown, for example, for a positive displacement motor, that to a first approximation:

$$S=a_1\Delta P^2+a_2Q$$

where $a_1$ and $a_2$ are constants and Q is the flow rate of drilling mud. In accordance with an embodiment of the present invention, constants $a_1$ and $a_2$ may be found by regression or the like from measurements of S, $\Delta P$ and Q.

In accordance with an embodiment of the present invention, establishing these relationships enables both the torque and speed of the downhole motor to be known and/or predicted for a given pressure drop and flow rate of mud in the drilling process.

In accordance with an embodiment of the present invention, rotor torque and speed are of particular relevance because it is these parameters which are provided by the motor manufacturer. Thus, in accordance with an embodiment of the present invention, an accurate model of torque and speed for a downhole motor may be obtained from actual measured data in real-time in contrast to being estimated using manufacturer guidelines, which may not provide for among other things, real-time determinations.

As discussed above, in embodiments of the present invention, once the relationships are established then the next step is to determine whether any combination of weight-on-bit and rotation speed provided by the relationships, can provide a greater rate of penetration.

As is known to the person skilled in the art, the power delivered by the motor or turbine can be given by the product of the torque generated and the speed of rotation of the rotor. Thus, by combining the torque and speed relationships, a relationship for mechanical power can be obtained.

However, as the rate of penetration optimisation requires the hydraulic power available to be related to the weight applied to the drill bit, in accordance with an embodiment of the present invention, a further relationship introducing weight applied on bit may be required.

For example, in embodiments of the present invention, a relationship between weight-on-bit (W) and torque generated by the rotor (T), given by:

$$T=\mu D_B W$$

where $\mu$ is a coefficient of friction and $D_B$ is the diameter of the drill bit, may be used to determine downhole motor characteristics/operational relationships.

Thus, in embodiments of the present invention, the weight-on-bit can be determined from either a direct measurement or from being inferred from the torque provided.

Once the weight-on-bit and rotation speed are known, in accordance with an embodiment of the present invention, the rate of penetration may be inferred from a chart for a given lithography. Alternatively, in some embodiments, the initial rate of penetration may be measured directly.

In accordance with an embodiment of the present invention, the next step is to determine if a greater rate of penetration is possible. In accordance with an embodiment of the present invention, from the determined predictive relationships, it is possible to determine the available combinations of rotation speed and torque for the rotor and stator within the available hydraulic power. In embodiments of the present invention, these available combinations may themselves be used to determine the available combinations of rotation speed and weight-on-bit. In accordance with an embodiment of the present invention, the predicted rate of penetration can therefore be determined for available combinations of rotation speed and weight-on-bit and compared to the current rate of penetration, i.e. the rate of penetration determined for the first period of time.

In embodiments of the present invention, once a new combination of weight-on-bit and rotation speed providing a greater rate of penetration has been determined, operating parameters are then adjusted in order to move towards the greater penetrating mode of operation. In embodiments of the present invention, these may be chosen, for example, from weight applied to the drill bit, rotation speed of the drill string, flow rate of mud through the drill and motor and/or the like.

Thus, in embodiments of the present invention, the relationships can be transmitted to the surface drilling operator—which may comprise a processor, software program and/or the like—so that the drilling operator can make an assessment of/process the current drilling performance and/or the location of a greater penetrating mode of operation.

Alternatively, in some embodiments, the relationships and current operating performance can be used to feed into an automated control apparatus to adjust operating parameters in order to move towards the more optimal mode of operation.

In accordance with an embodiment of the present invention, once the first greater penetrating mode of operation has been arrived at, the relationships employed to get there may, however, no longer be entirely accurate. This is because the rotor may now be operating based on extrapolated performance from the predictive relationships.

Therefore, in some embodiments, once the downhole motor/drilling system is operating at the first greater penetrating mode of operation, the method of embodiments of the invention may be carried out again to measure a second set of rotor and stator operating parameters, generate a second set of relationships to determine a second greater penetrating mode of operation, and to alter the operating parameters to move towards the second greater penetrating mode of operation.

If necessary or advantageous, the method of embodiments of the present invention discussed above can be repeated again or as often as desired, until no further optimisation of the rate of penetration of the rotor are found.

As described above, such repeated action can be carried out manually by a skilled drilling operator or, for example, as part of an automated control scheme.

However, even when the greatest available rate of penetration has been arrived at, the method of certain embodiments of the present invention may provide further benefits and advantages as drilling progresses.

As the drill continues to drill into the earth, the performance of the rotor and stator can change with time. This can be due to a number of factors such as changes in temperature and pressure or a change in the properties of the drilling mud. Additionally the motor or drill bit may experience wear and its performance affected accordingly. Also, perhaps even more importantly changes in lithography can be sudden, greatly altering the rate of penetration.

Thus, in accordance with an embodiment of the present invention, the techniques described above may be used to determine the performance of the drill as drilling progresses, acting as a diagnostics tool, e.g. for mechanical failure or monitoring changes in lithography, and/or the like.

Thus, in accordance with an embodiment of the present invention, once the greatest rate of penetration has been found, changes to the performance of the drill as drilling continues may result in a shifting of the operating parameters that will provide the greatest rate of penetration as drilling progresses. Such changes may be gradual, e.g. in the case of mechanical wear or changes in temperature and pressure, or can be sudden, e.g. in the case of mechanical failure or a change in the lithography of the rock being drilled into.

Thus, in some embodiments, even after the greatest rate of penetration may have been determined, the methods of embodiments of the invention, as discussed above, may be carried out again at a later period of time i.e. when the drill has progressed further into the earth. This will result in a further set of measured operating parameters, which are employed to generate a further set of relationships.

The further set of relationships may indicate a new further greater rate of penetration. The operating parameters can then be altered to move towards this new further greater rate of penetration. In accordance with an embodiment of the present invention, ss before, the steps of measuring and finding a greater rate of penetration can be carried out repeatedly until no further more optimal modes of operation can be found.

Thus, in embodiments of the present invention, the method can be repeated as often as desired. In one embodiment, the measured parameters and relationships in the method discussed above are continuously updated in real-time as the drill proceeds. Thus, embodiments of the invention may provide a real-time determination of the hydraulic performance of the rotor and stator, to enable continuous adjustment, optimisation and/or diagnostics as drilling progresses.

In a further refinement, embodiments of the present invention may be applied in a managed pressure drilling operation. Managed pressure drilling involves the control of the bottom hole pressure by such parameters as the density of drilling mud, variation in the pressure applied to the drilling mud—e.g. by a choke at the surface, a pump and/or the like—injection of gas into the wellbore/drilling system and/or the like.

Drilling operators have known for some time that careful control of the bottomhole pressure is necessary when drilling into a variety of formations. In simple terms the bottomhole pressure should be greater than the pore pressure otherwise pore fluids will ingress into the drilled wellbore. Additionally, the bottomhole pressure should not be so great as the cause fracture of the already drilled wall of the wellbore, often called the fracture limit.

However, it is also possible to operate below the pore pressure, a condition known as being underbalanced. However when underbalanced, it is appreciated that surrounding formation fluids will ingress into the formed wellbore, which ingress needs to be managed. A typical operating condition is therefore to be safely above the pore pressure, a condition known as being overbalanced.

Thus, operating with the bottom hole pressure above the pore pressure, i.e. being overbalanced, without exceeding the fracture limit is the typical desirable operating condition for a drilling procedure.

Embodiments of the present invention are of particular relevance to managed pressure drilling because greater possibilities for increasing the rate of penetration become possible in managed pressure drilling. In accordance with an embodiment of the present invention, managed pressure drilling allows additional parameters to be introduced into the rate of penetration optimisation method. Notably, in embodiments of the present invention, the additional parameters include the density of the drilling mud, the fluid pressures applied to the downhole motor by the drilling fluid (which may be under pressure/injected with gas etc.), the choke pressures, gas injection rates and/or the like.

In embodiments of the present invention, by varying these parameters, a wider range of mud flow rates can be achieved, giving potentially greater scope for optimizing rate of penetration by the methods described above. Additionally, in accordance with an embodiment of the present invention, other constraints are introduced, such as the fracture pressure limit and pore pressure limit described above, into the determination of optimized performance.

However in certain embodiments, the inventors have found that, surprisingly, a particularly effective mode of drilling to increase the rate of penetration may be by operating in an underbalanced mode. As discussed above, operating underbalanced allows the ingress of formation fluid, and this must therefore be managed. However, in accordance with an embodiment of the present invention, it has been found that significantly greater rates of penetration can be achieved when operating the downhole motor in the underbalanced condition. This occurs, because the ingress of formation fluid actively helps in the break-up of the formation rock, improving drilling performance, due to the formation fluid entering the wellbore.

In accordance with an embodiment of the present invention, it may therefore be desirable to operate in an underbalanced mode when experiencing a particularly low rate of penetration, in order to drill through the harder formation more quickly. Once through the particularly hard formation, it may then be desirable to return to an overbalanced mode of operation, to prevent any further ingress of formation fluid.

It will be appreciated that the density of the drilling fluid is difficult to alter on a short timescale. In practice, the density may therefore be determined prior to a drilling run based on predictions of the lithography ahead or on previous drill runs for example. In accordance with an embodiment of the present invention, using the downhole characterization methods described above, the drilling fluid density can be determined in advance in order to provide a greater possibility for rate of penetration optimization.

For example, in embodiments of the present invention, operating at a reduced mud density can enable a greater fluid flow rate whilst still operating at an acceptable bottomhole pressure. And as discussed above, the greater fluid flow rate can provide greater speeds and torques of the rotor, thus producing a greater rate of penetration.

In accordance with an embodiment of the present invention, the choke pressures, e.g. those applied at the surface, may be altered on a very short timescale and can therefore be employed in a real-time rate of penetration optimization system using the determined downhole motor operation/optimization output from the methods discussed above.

In accordance with an embodiment of the present invention, real-time downhole measurements were used in a test to study the performance of drilling motors and turbines, to optimize the operation of the drill.

The field test used a bottomhole apparatus (BHA), a 6¾ in PDC bit and above these components a 4¾ inch mud motor and/or a 4¾ in turbine. The drilling system included a measuring-while-drilling ("MWD") tool. The MWD tool was modified to determine the speed and position of the shaft of the motor or turbine and to transmit it to the surface in real-time. In addition, the BHA was fitted with a Drilling Dynamics Board ("DDB"), a compact board containing multiple sensors, power and memory. DDBs were placed at three locations along the BHA: in the bit, in the collar of the motor or turbine, and in a short sub placed directly above the MWD. Nine BHAs were run during the experiment that tested both the motor and turbine, as well as a number of different bits and stabilizer positions.

The MWD tool was used during the test as its modular architecture meant it was fast enough to implement the modifications necessary to measure motor speed. The tool attached to a rigid "probe" that screwed into a small bore made in the top of the rotor catcher that connects to the top of either the motor or turbine. During the experiment, the probe ran inside a stabilizer that sat between the motor/turbine and the MWD tool.

In accordance with an embodiment of the present invention, the angular position and rotation speed of the probe was measured by the MWD tool using two magnets and an induction coil. These signals were transmitted to the surface in real-time using the MWD's emag link as well as being stored to the tool's memory at 600 Hz sample rate. In accordance with an embodiment of the present invention, the real-time signals provided by the system provided never-before-seen information on the performance of the motor and turbine and were essential in constructing the performance characteristics and real-time optimization discussed in the following sections.

In accordance with an embodiment of the present invention, provided the drillstring is rotating and assuming that wellbore friction is constant, the torque at the motor and the differential pressure across it can be estimated from surface measurements of drillstring torque and pump pressure respectively. In embodiments of the present invention, this is done by subtracting out the off-bottom values of these measurements when drilling. In accordance with an embodiment of the present invention, using this procedure, the relationship between motor torque and differential pressure in real-time was generated An example of this processing is shown in FIG. 1. It is interesting to note that the torque generated by the motor was less than that predicted by the published curves (generated by surface tests).

In accordance with an embodiment of the present invention, to construct the model of motor speed, downhole measurements are required. During the field test, these were supplied by the Extreme MWD system described above. As motor speed is a function of mud flow, In embodiments of the present invention, the relationship between speed and differential pressure was examined at different flow rates.

Figure 2:
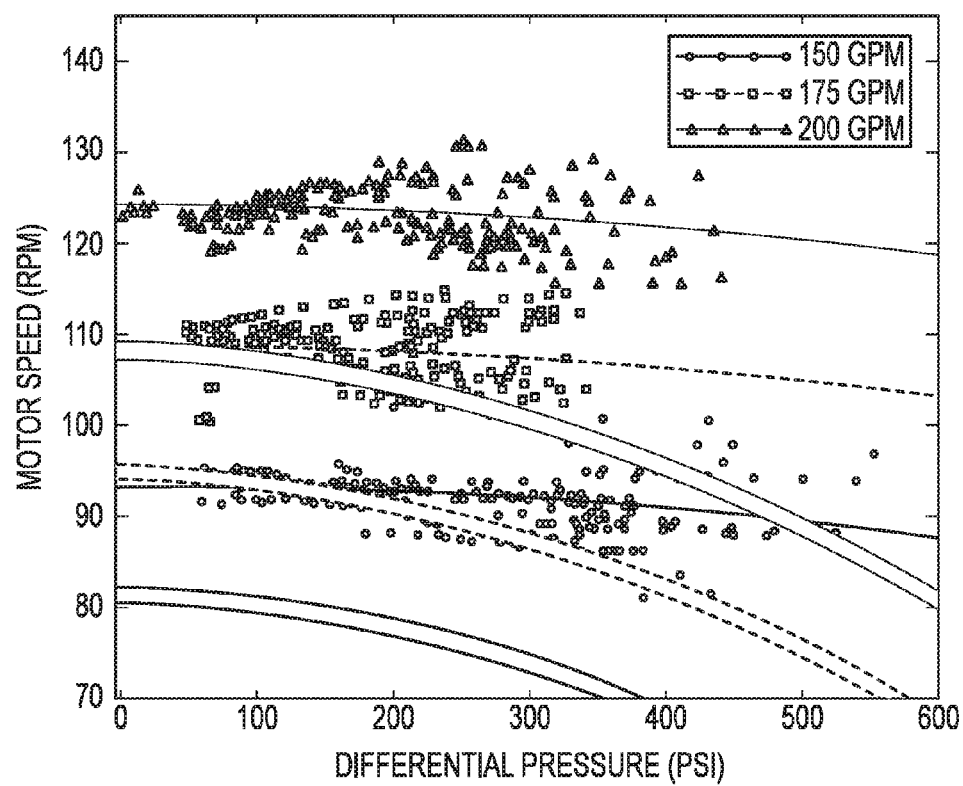
FIG. 2 is a chart of the rotation speed of the rotor as a function of differential pressure across the rotor at three different drilling mud flow rates.

An example of this is shown in FIG. 2. As can be seen from this example, the measured speed from the motor was often 10-20% higher than predicted by the published curves. Also, the roll-off (the rate at which the motor speed drops with increasing differential pressure) was significantly less severe than predicted.

Drilling turbines generate a relatively constant pressure drop, so typically only the relationship between torque, speed and power are considered. In embodiments of the present invention, as was done when drilling with mud motors, the downhole torque was estimated from the surface torque, however, it should be mentioned that this technique is far more susceptible to errors when drilling with a turbine, as the torque generated by the turbine is considerably less than by a mud motor and can often be masked by the wellbore torsional friction.

Figure 3A:
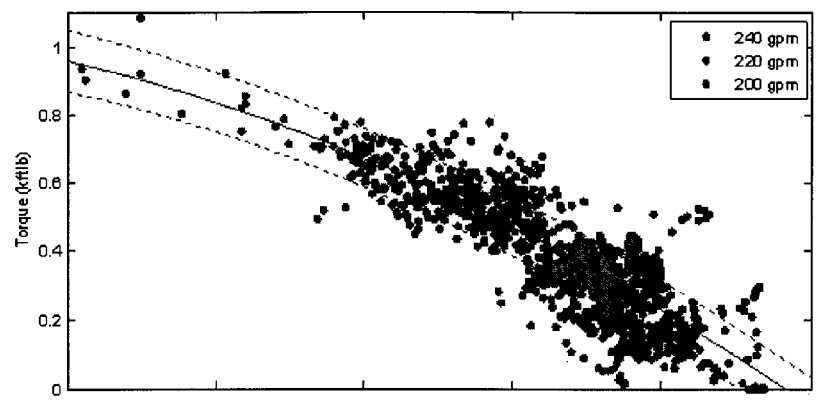
FIG. 3a is a chart of the torque measured on the rotor of a turbine as a function of rotational speed.
Figure 3B:
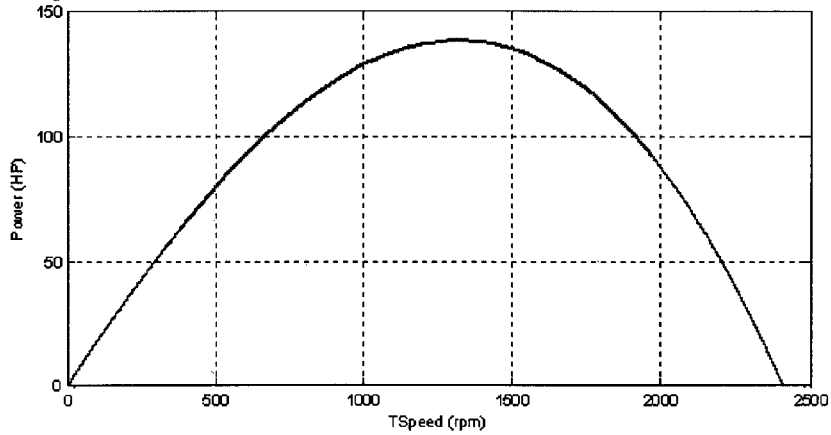
FIG. 3b is a chart of the power generated by the turbine of FIG. 3a as a function of rotational speed.
Figure 3C:
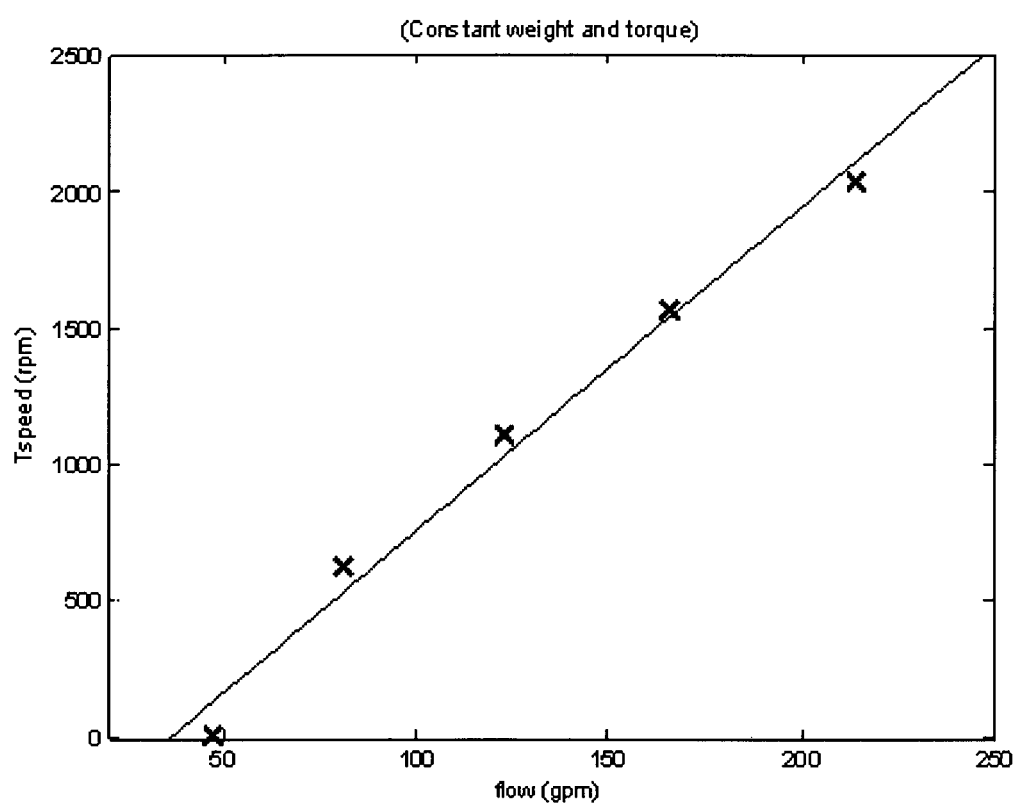
FIG. 3c is a chart showing the measured rotational speed of the turbine as a function of flow rate of drilling mud through the turbine.

The turbine performance curves generated, in accordance with an embodiment of the present invention, using the real-time data available during the field test is shown in FIGS. 3a-c. In this case, there were no published curves to compare against, as turbines are not as routinely subjected to the same dynamometer surface tests that mud motors are.

Figure 4:
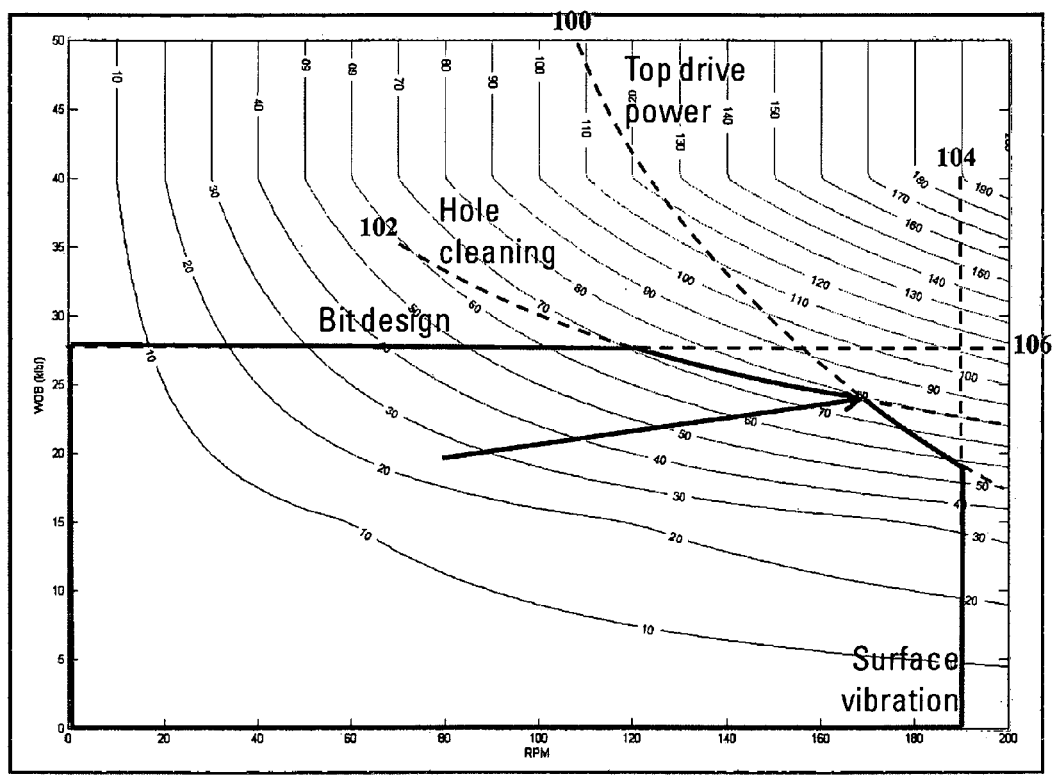
FIG. 4 is a chart showing the predicted rate of penetration for a given lithography as a function of weight-on-bit and rotation speed of the drill bit, in accordance with an embodiment of the present invention.

FIG. 4 shows a chart with contours of rate of penetration as a function of weight-on-bit and rotation speed. In accordance with an embodiment of the present invention, the contours are generated for a given lithography and from experiments carried out previously. It can be clearly seen that the greatest rate of penetration is provided by maximizing both the weight-on-bit as well as the rotation speed of the drill bit.

Also shown is the constraint 100 on the combinations of weight-on-bit and rotation speed possible by the top drive power available, before including any additional hydraulic power available from the mud motor. Also shown are other constraints limiting the combinations of weight-on-bit and rotation speed, for example the rate at which cuttings can be removed from the drill bit by the flowing mud 102, the tolerance for surface vibration due to excessive rotation speed 104 and the maximum weight-on-bit due to drill bit specification or maximum torque for the drill pipe or top drive 106.

It can be seen from FIG. 4 that the maximum rate of penetration is provided by the intersection of the constraints for the maximum power available from the top drive and the rate at which cutting can be removed.

It can therefore be clearly seen that having an accurate knowledge of the current additional hydraulic power available based on real-time measurements, effectively allows the top drive power constraint to be lifted, opening up combinations of weight-on-bit and rotation speed which provide an increased rate of penetration.

In accordance with an embodiment of the present invention, an optimization algorithm, was used in the test. In accordance with an embodiment of the present invention, at the onset of the test, the algorithm did not instruct the driller and instead only absorbed the necessary operating parameter measurements to build the initial models of motor and bit performance. During this time, the driller used a weight of no more than 5 klb and a drillstring rotation speed of 40 rpm, which were the parameters the driller had been using previously during the field experiment.

Figure 5:
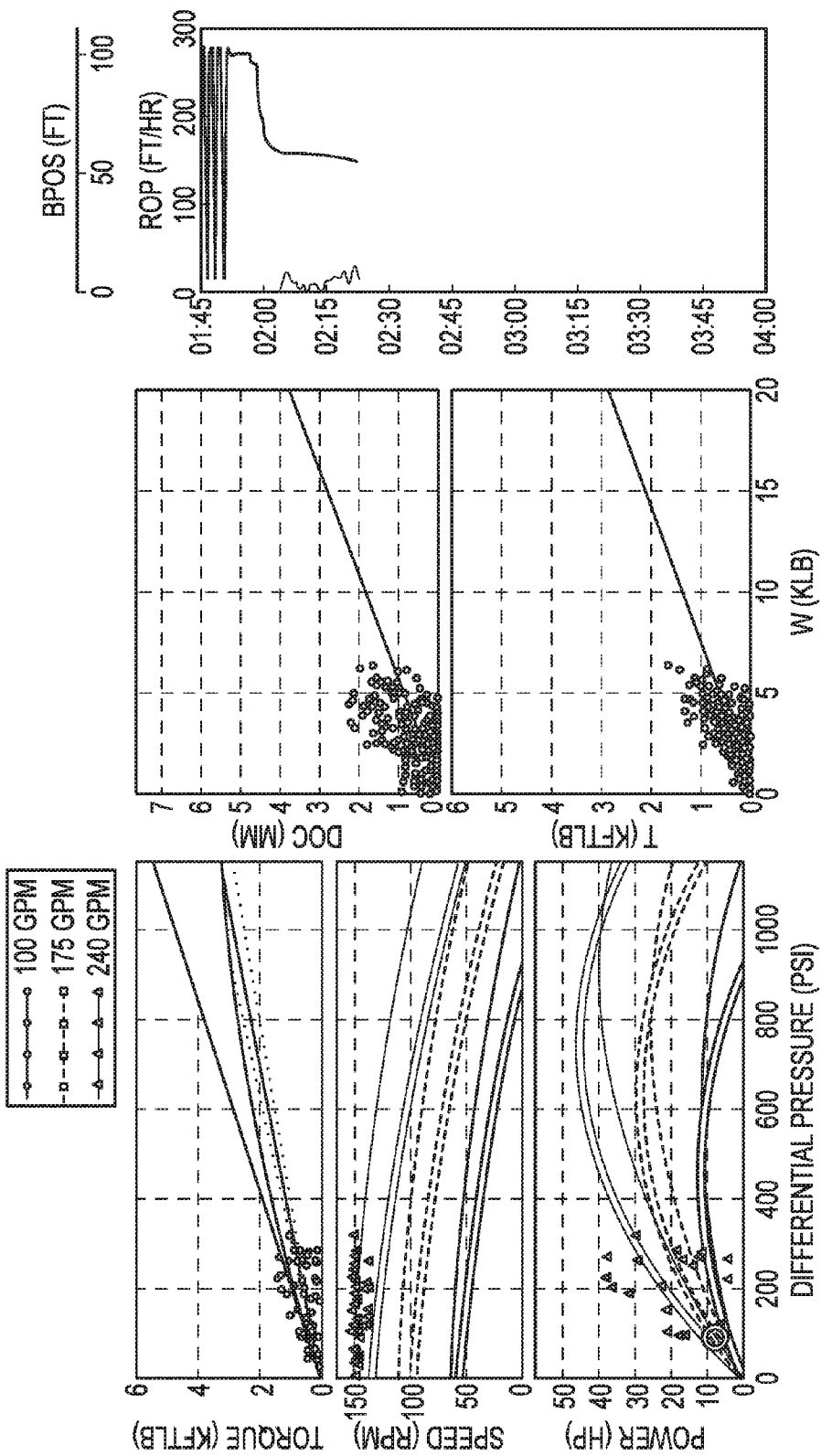
FIG. 5 shows a variety of charts showing the torque, speed and resulting power output of a drilling motor as a function of differential pressure across the rotor, in accordance with an embodiment of the present invention. The charts compare manufacturer's provided data (shaded bands) measured data (indicated by the points) and best fit curves to the measured data (indicated by the solid lines). Also shown are charts of the degree of cut (DOC) and torque as a function of weight on bit (W).

The results of the algorithm during this initial period can be seen in FIG. 5. In this figure, the motor performance curves estimated from the real-time measurements are shown on the leftmost plot. On this plot, measurements are indicated by the points and the solid lines represent the regression fits. Also on this plot are thick faint lines representing the published motor curves. As was mentioned above, the motor was generating less torque and more speed than was expected by published curves.

The motor output power is shown at the bottom left of FIG. 5. As can be seen, the driller's choice of operating parameters was generating up to about 300 psi of differential pressure (the black circle in this plot shows the driller's current operating point), however the curve has a maximum of about 900 psi, suggesting that the driller is using only about a third of the maximum power available from the motor. The top left plot shows that 900 psi differential pressure corresponds to about 2.5 kftlb of downhole torque.

The middle two plots in FIG. 5 show the relationship between weight, torque and depth-of-cut (the distance drilled per revolution of the bit). Thus, the real-time models suggest that should the driller push the weight up to 17 klb, the motor would output its maximum power and the depth-of-cut would be maximized.

Figure 6:
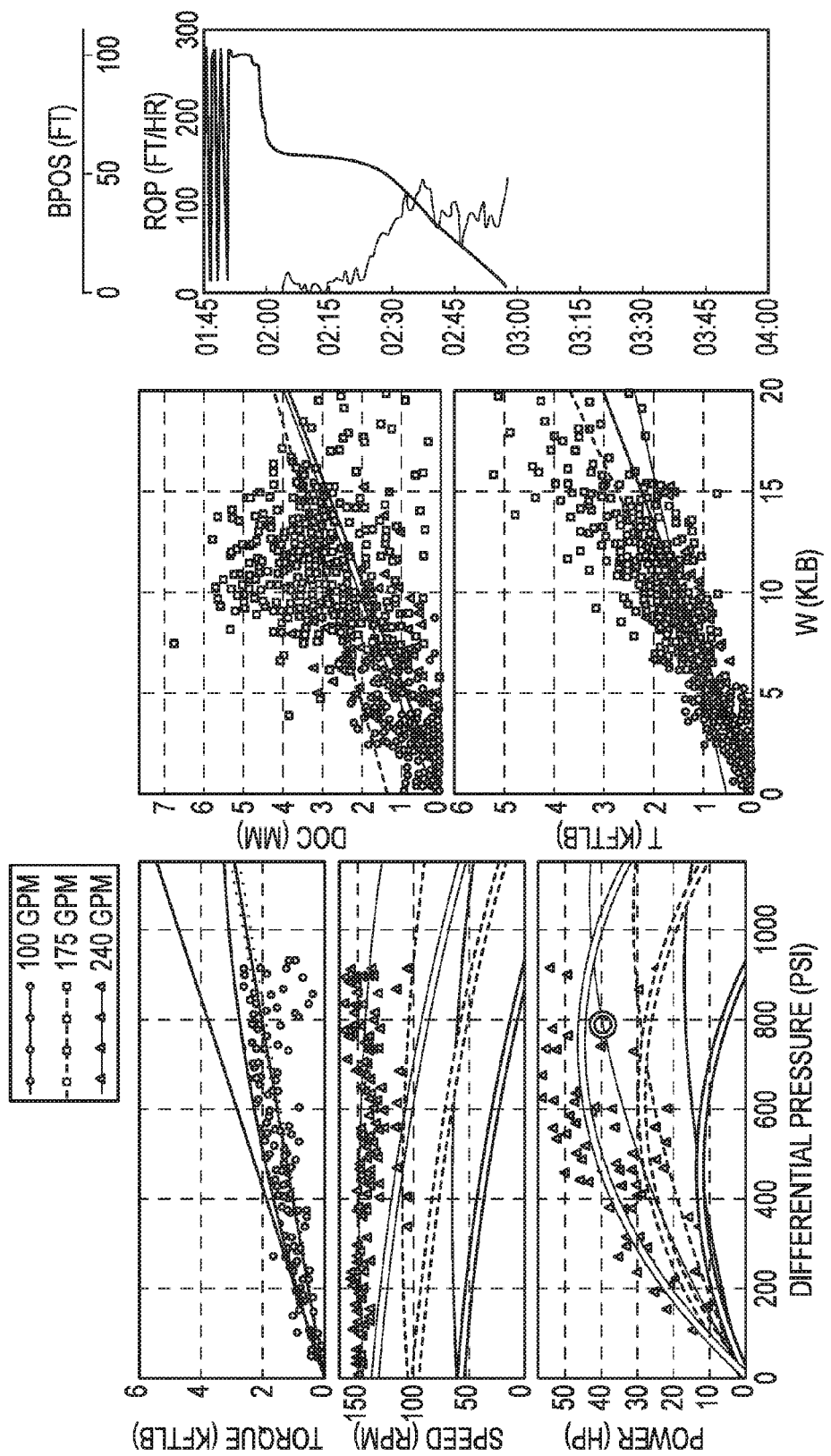
FIG. 6 is a similar plot to that of FIG. 4 wherein the measured data has been measured over a broader range of differential pressures, In accordance with an embodiment of the present invention, in accordance with an embodiment of the present invention.

The driller was then instructed to apply 15 klb of weight. The results of this are shown in FIG. 6. Once again, the motor performance curves are shown on the left of this figure and now show measurements (the dots) up to about 900 psi differential pressure. The model curves are continuously updated and have adjusted slightly with the new measurements, showing that the maximum motor output power now appears to occur at about 1000 psi differential pressure.

It is interesting to note that the predicted motor power curves (the faint red line in the lower right plot) suggest that the max output power of the motor occurs at about 700 psi differential pressure. It is only by using real-time measurements, in accordance with an embodiment of the present invention, that the true motor power curve can be seen.

At this point, it was established that 15 klb was an almost optimal weight to apply, as it generated almost the maximum output power of the motor. The real-time measurement of motor performance provided immediate feedback, in accordance with an embodiment of the present invention, as to the operating point along the motor's power curve and also highlighted some differences with the published curves.

Also worth noting is the ROP log shown on the right of FIG. 6. When the driller was using 5 klb, the ROP was about 20-30 ft/hr. When the driller was using 15 klb (as recommended by the algorithm), the ROP increased to about 100 ft/hr.

At this point, it was determined that 15 klb was a good weight to apply, as it generated almost the maximum output power of the motor. The next step of the algorithm, In accordance with an embodiment of the present invention, was to modify the drillstring rotation speed.

In the ROP optimization algorithm, in accordance with an embodiment of the present invention, the maximum drillstring rotation is usually limited by shock and vibration. Ideally, In embodiments of the present invention, this limit would come from downhole measurements such as those made by the DDBs located in the BHA. Currently, the DDBs record to memory and no real-time information was available from downhole as to the state of shock and vibration. So in the test, the drillstring rotation was increased until shock and vibration were noticeable at the surface, which occurred at 90 rpm.

Figure 7:
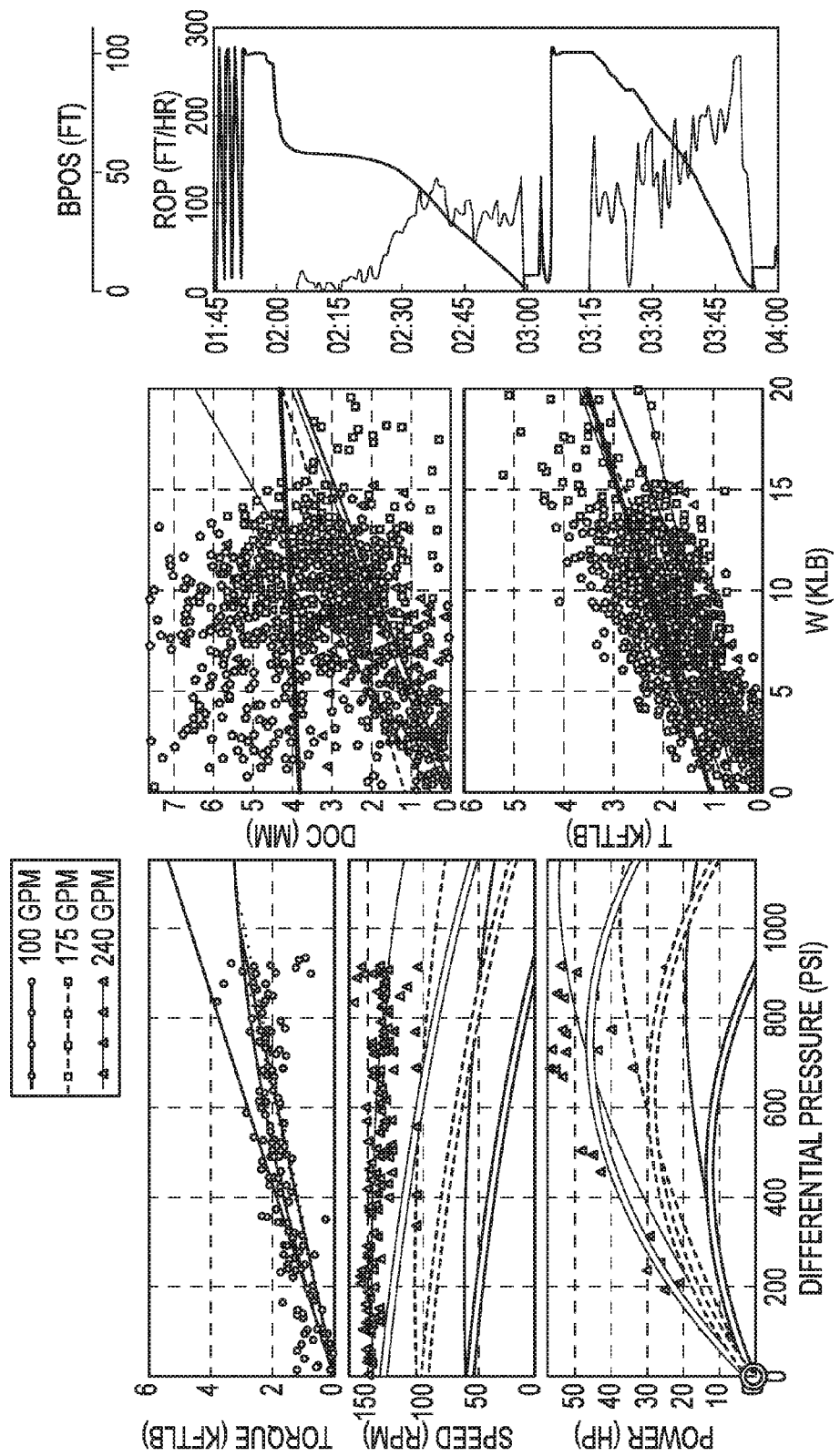
FIG. 7 is a similar plot to that of FIG. 6, wherein the increased rate of penetration is shown, in accordance with an embodiment of the present invention.
Figure 8:
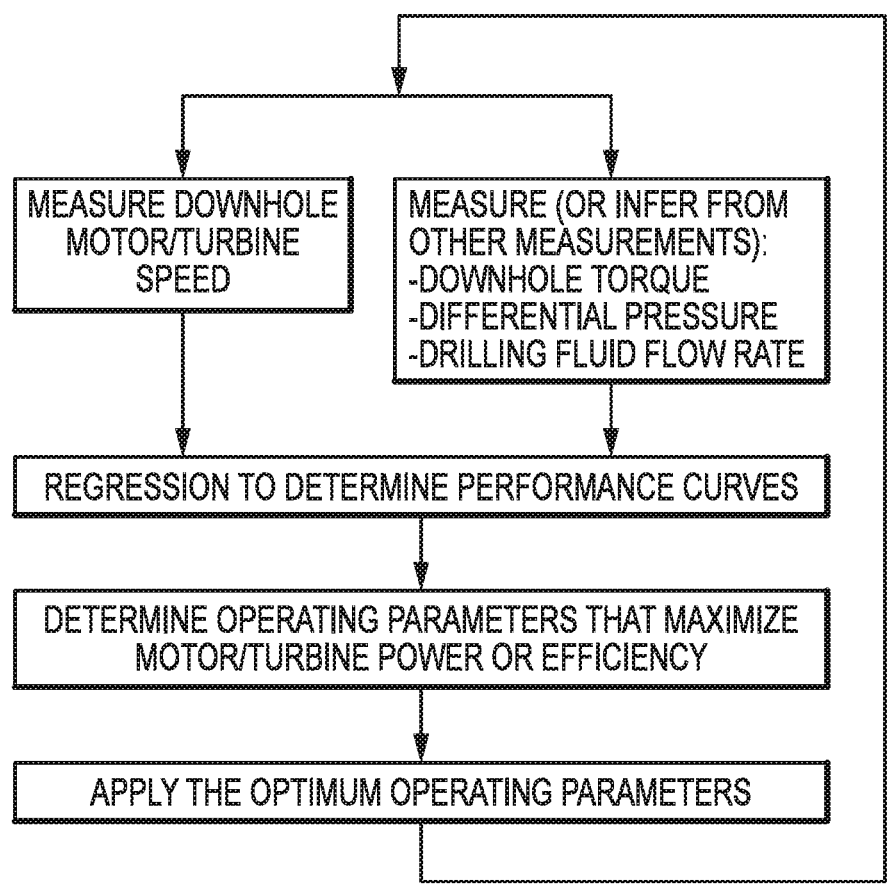
FIG. 8 is a flow chart indicating schematically how the embodiments of the invention may be carried out.

The results after drilling with a drillstring rotation of 90 rpm (while maintaining a weight of 15 klb) are shown in FIG. 7. As can be seen, the increased shock and vibration has produced more noise (spread) on the correlations used in the bit model (center plot). More interesting, however, is that with the new operating parameters, the ROP increased to 280 ft/hr.

In embodiments of the present invention, the measured curves may also be used to optimize the instantaneous power or efficiency of the motor, and by monitoring these curves over time, performance degradation, motor wear and the onset of motor failure may be monitored.

Furthermore, In accordance with an embodiment of the present invention, the above analysis can be repeated or continuously updated as drilling progresses in order to monitor and react to any movement in the optimal operating mode of the drill.

The invention has now been described in detail for the purposes of clarity and understanding. However, it will be appreciated that certain changes and modifications may be practiced within the scope of the appended claims. More-over, in the foregoing description, for the purposes of illustration, various methods and/or procedures were described in a particular order. It should be appreciated that in alternate embodiments, the methods and/or procedures may be performed in an order different from that described.

The invention claimed is:

1. A method of optimising the rate of penetration of drilling equipment comprising a drillstring extending within a wellbore from the surface to a downhole motor connected to a drill bit to extend the wellbore into the earth, wherein the motor comprises a hydraulically or pneumatically powered rotor and stator and is driven by through flow of drilling fluid pumped from the surface to the downhole motor through the drillstring, the method comprising:

(a) measuring a first set of rotor and stator operating parameters including the weight applied to the drill bit, fluid flow rate and pressure drop through the downhole motor, the speed of rotation of the rotor and rotor torque, while drilling for a first period of time, (b) generating a first set of relationships from the first set of operating parameters to enable the rotor rotation speed and rotor torque to be predicted over a range of operating parameter values, these relationships comprising at least:
rotor torque as a function of pressure drop due to energy transfer to the rotor,
rotor rotation speed as a function of pressure drop due to energy transfer to the rotor and flow rate through the downhole motor, and
rotor torque as a function of weight applied to the drill bit, (c) determining the rate of penetration for the first period of time from measurements of weight applied to the bit and rotation speed of the bit, (d) determining whether any other combination of weight applied to bit and rotation speed of bit, provided by the relationships determined in step (b) are capable of providing a greater rate of penetration, and (e) adjusting at least one operating parameter to move the weight applied to bit and/or speed of rotation of bit towards the combination which provides a first greater rate of penetration.

2. The method according to claim 1, wherein the downhole motor is a positive or cavity displacement motor or a turbine.

3. The method according to claim 1, wherein the measurement of the rotation speed of the motor is made downhole in the vicinity of the rotor.

4. The method according to claim 1, wherein the torque produced by the rotor is measured downhole.

5. The method according to claim 1, wherein the drilling equipment includes a drive at the surface and the drill string extends from the drive at the surface to the downhole motor, and wherein in step (e), the at least one operating parameter which is adjusted comprises at least one of rotation speed of the drill string and flow rate of drilling fluid through the downhole motor.

6. The method according to claim 1, wherein, once at the first greater rate of penetration, the method of the invention is carried out again to measure a second set of rotor and stator operating parameters while drilling, generate a second set of relationships to determine a second greater rate of penetration, and to alter the operating parameters to move towards the second greater rate of penetration.

7. The method according to claim 6, wherein the method is repeated again or as often as desired, until no further optimisation of the penetration of the rotor are found.

8. The method according to claim 1, wherein following a period of drilling, the method is carried out again at a later period of time, resulting in a further set of measured operating parameters which are employed to generate a further set of relationships, which may indicate a new further greater rate of penetration, and the operating parameters can then be altered to move towards this new further greater rate of penetration.

9. The method according to claim 1, wherein following a period of drilling, the method is carried out again at a later period of time, resulting in a further set of measured operating parameters which are employed to generate a further set of relationships, which are employed to monitor and diagnose problems arising during drilling.

10. The method according to claim 1, wherein the method is carried out repeatedly whilst drilling, to provide a real-time determination of the hydraulic performance of the rotor and stator and to enable continuous adjustment and optimisation of rate of penetration to occur as drilling progresses.

11. The method according to claim 1, wherein the set of operating parameters at step (a) include the density of drilling fluid, the bottom hole fluid pressure and pressure applied to the drilling fluid at the surface.

12. A system for optimising the rate of penetration of drilling equipment comprising a drillstring extending within a wellbore from the surface to a downhole motor connected to a drill bit to extend the wellbore into the earth, wherein the motor comprises a hydraulically or pneumatically powered rotor and stator and is driven by through flow of drilling fluid pumped from the surface to the downhole motor through the drillstring, the system comprising:

one or more sensors configured to measure a first set of rotor and stator operating parameters including the weight applied to the drill bit, fluid flow rate and pressure drop through the downhole motor, the speed of rotation of the rotor and rotor torque while drilling for a first period of time; and a processor configured to:
generate a first set of relationships from the first set of operating parameters to enable the rotor rotation speed and rotor torque to be predicted over a range of operating parameter values, these relationships comprising at least:
rotor torque as a function of pressure drop due to energy transfer to the rotor,
rotor rotation speed as a function of pressure drop due to energy transfer to the rotor and flow rate through the downhole motor, and
rotor torque as a function of weight applied to the drill bit,
determine the rate of penetration for the first period of time from measurements of weight applied to the bit and rotation speed of the bit,
determine whether any other combination of weight applied to bit and rotation speed of bit, provided by the first set of relationships are capable of providing a greater rate of penetration, and
send a signal to adjust at least one operating parameter to move the weight applied to bit and/or speed of rotation of bit towards the combination which provides a first greater rate of penetration.

13. The system of claim 12, wherein at least one of the one or more sensors comprise measurement while drilling sensors.

14. The system of claim 12, wherein the processor is positioned at a downhole location.

15. The system of claim 12, wherein the signal is communicated to the surface by wired drill pipe.

16. A method of optimising the rate of penetration of drilling equipment comprising a drillstring extending within a wellbore from the surface to a downhole motor connected to a drill bit to extend the wellbore into the earth, wherein the motor comprises a hydraulically or pneumatically powered rotor and stator and is driven by through flow of drilling fluid pumped from the surface to the downhole motor through the drill string and wherein density of drilling fluid and pressure applied at the surface are such that drilling is carried out with a bottom-hole pressure below that of the formation fluid pressure, the method comprising:
(a) measuring a first set of rotor and stator operating parameters including the weight applied to the drill bit, fluid flow rate and pressure drop through the downhole motor, density of drilling fluid, bottom hole fluid pressure, pressure applied to the drilling fluid at the surface, rotation speed of the rotor and rotor torque, while drilling for a first period of time,
(b) generating a first set of relationships from the first set of operating parameters to enable the rotor rotation speed and rotor torque to be predicted over a range of operating parameter values, these relationships comprising at least:
rotor torque as a function of pressure drop due to energy transfer to the rotor,
rotor rotation speed as a function of pressure drop due to energy transfer to the rotor and flow rate through the downhole motor, and
rotor torque as a function of weight applied to the drill bit,
(c) determining the rate of penetration for the first period of time from measurements of weight applied to the bit and rotation speed of the bit,
(d) determining whether any other combination of weight applied to bit and rotation speed of bit, provided by the relationships determined in step (b) are capable of providing a greater rate of penetration, and
(e) adjusting at least one operating parameter to move the weight applied to bit and/or speed of rotation of bit towards the combination which provides a first greater rate of penetration.

17. The method according to claim 16, wherein the drilling equipment includes a drive at the surface and the drill string extends from the drive at the surface to the downhole motor, and wherein in step (e), the at least one operating parameter which is adjusted comprises at least one of rotation speed of the drill string and flow rate of drilling fluid through the downhole motor.

18. The method according to claim 17, wherein in step (e), the at least one operating parameter which is adjusted comprises weight applied to the drill bit and also at least one of rotation speed of the drill string and flow rate of drilling fluid through the downhole motor.

19. A system for optimising the rate of penetration of drilling equipment comprising a drillstring extending within a wellbore from the surface to a downhole motor connected to a drill bit to extend the wellbore into the earth, wherein the motor comprises a hydraulically or pneumatically powered rotor and stator and is driven by through flow of drilling fluid pumped through the drillstring from the surface, the system comprising:
one or more sensors configured to measure a first set of rotor and stator operating parameters including the weight applied to the drill bit, fluid flow rate and pressure drop through the downhole motor, the speed of rotation of the rotor and rotor torque for a first period of time; and
a processor configured to:
generate a first set of relationships from the first set of operating parameters to enable the rotor rotation speed and rotor torque to be predicted over a range of operating parameter values, these relationships comprising at least:
rotor torque as a function of pressure drop due to energy transfer to the rotor,
rotor rotation speed as a function of pressure drop due to energy transfer to the rotor and flow rate through the downhole motor, and
rotor torque as a function of weight applied to the drill bit,
determine the rate of penetration for the first period of time from measurements of weight applied to the bit and rotation speed of the bit,
determine whether any other combination of weight applied to bit and rotation speed of bit, provided by the relationships determined in step (b) are capable of providing a greater rate of penetration, and
send a signal to adjust at least one operating parameter to move the weight applied to bit and/or speed of rotation of bit towards the combination which provides a first greater rate of penetration.

20. The system of claim 19, wherein the drilling equipment includes a drive at the surface and the drill string extends from the drive at the surface to the downhole motor and wherein the processor is configured to be able to send signals to adjust any one or more of the weight applied to the drill bit, drilling fluid flow rate and pressure drop through the downhole motor.

* * * * *